United States Patent
Wyatt et al.

(10) Patent No.: US 7,827,333 B1
(45) Date of Patent: Nov. 2, 2010

(54) SYSTEM AND METHOD FOR DETERMINING A BUS ADDRESS ON AN ADD-IN CARD

(75) Inventors: David Wyatt, San Jose, CA (US); Hon Fei Chong, Campbell, CA (US); Rambod Jacoby, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 151 days.

(21) Appl. No.: 12/025,708

(22) Filed: Feb. 4, 2008

(51) Int. Cl.
  *G06F 13/00* (2006.01)
  *G06F 3/00* (2006.01)
  *H05K 7/10* (2006.01)
(52) U.S. Cl. .................... 710/104; 710/9; 710/301; 710/302
(58) Field of Classification Search ............. 710/104, 710/301–306, 4, 62, 9
  See application file for complete search history.

(56) References Cited

U.S. PATENT DOCUMENTS

| | | | | |
|---|---|---|---|---|
| 5,204,669 A * | 4/1993 | Dorfe et al. | | 340/825.52 |
| 5,276,813 A * | 1/1994 | Elliott et al. | | 710/9 |
| 5,600,354 A * | 2/1997 | Hackleman et al. | | 347/50 |
| 6,070,207 A * | 5/2000 | Bell | | 710/302 |
| 6,363,423 B1 * | 3/2002 | Chiles et al. | | 709/224 |
| 6,546,425 B1 * | 4/2003 | Hanson et al. | | 709/227 |
| 6,546,435 B1 * | 4/2003 | Yoshimura et al. | | 710/4 |
| 6,708,230 B2 * | 3/2004 | Shin | | 710/9 |
| 6,832,270 B2 * | 12/2004 | Das Sharma et al. | | 710/15 |
| 6,928,503 B1 * | 8/2005 | Mosgrove | | 710/302 |
| 6,956,579 B1 * | 10/2005 | Diard et al. | | 345/537 |
| 7,007,080 B2 * | 2/2006 | Wilson | | 709/221 |

(Continued)

FOREIGN PATENT DOCUMENTS

EP   1631042 A1 *  3/2006

(Continued)

OTHER PUBLICATIONS

Maamoun et al., "Interfacing in Microprocessor-based Systems with a Fast Physical Addressing", 2003, IEEE, Proceedings of the 3rd IEEE International Workshop on system-on-Chip for Real-Time Applications, pp. 1-6.*

(Continued)

*Primary Examiner*—Mark Rinehart
*Assistant Examiner*—Faisal M Zaman
(74) *Attorney, Agent, or Firm*—Patterson & Sheridan, LLP

(57) ABSTRACT

One embodiment of the present invention sets forth a technique to determine a bus address for an add-in card on a System Management bus (SMbus) that includes a hybrid microcontroller (hEC) and discrete graphics processing unit (dGPU). A graphics driver requests the System Basic Input/Output System (SBIOS) for a list of available slave addresses. The graphics driver receives the list and selects an available slave address to be assigned to the hEC. The graphics driver assigns the selected address to the hEC through an Inter-Integrated Circuit bus backdoor. The graphics driver then passes the selected address back to the SBIOS and the selected address is removed from the list of available addresses. Advantageously, this approach to dynamically assigning bus addresses provides compatibility with different types of hECs as well as with different motherboard configurations and other SMbus devices.

22 Claims, 3 Drawing Sheets

U.S. PATENT DOCUMENTS

| | | | | |
|---|---|---|---|---|
| 7,065,630 B1 * | 6/2006 | Ledebohm et al. | ........... | 711/206 |
| 7,269,832 B2 * | 9/2007 | Bodin et al. | ................. | 719/321 |
| 7,337,036 B2 * | 2/2008 | Pedrini et al. | ............... | 700/141 |
| 7,437,494 B2 * | 10/2008 | Ellerbrock | ................... | 710/113 |
| 7,707,437 B2 * | 4/2010 | Berenbaum et al. | ......... | 713/300 |
| 2001/0044860 A1 * | 11/2001 | Hinrichs et al. | ................. | 710/9 |
| 2003/0149821 A1 * | 8/2003 | Matsui et al. | ............... | 710/301 |
| 2003/0188062 A1 * | 10/2003 | Luse et al. | .................. | 710/104 |
| 2006/0282604 A1 * | 12/2006 | Temkine et al. | ............. | 710/314 |
| 2007/0245046 A1 * | 10/2007 | Asaro et al. | ................... | 710/62 |
| 2008/0028181 A1 * | 1/2008 | Tong et al. | .................. | 711/207 |

FOREIGN PATENT DOCUMENTS

| | | | |
|---|---|---|---|
| JP | 2000209209 A | * | 7/2000 |
| JP | 2001136171 A | * | 5/2001 |
| JP | 200337788 A | * | 11/2003 |
| WO | WO 2007074283 A2 | * | 7/2007 |

OTHER PUBLICATIONS

Johansson, Peter, "Virtual Node IDs", Oct. 15, 1998, Congruent Software, Inc., pp. 1-6.*

James, David V., "Scalable I/O Architecture for Buses", 1989, IEEE, COMPCON Spring '89, pp. 539-544.*

* cited by examiner

SYSTEM AND METHOD FOR DETERMINING A BUS ADDRESS ON AN ADD-IN CARD

BACKGROUND OF THE INVENTION

1. Field of the Invention

The present invention relates generally to the field of graphics processing and more specifically to a system and method for determining a bus address on an add-in card.

2. Description of the Related Art

A typical computing system includes a central processing unit (CPU) and a graphics processing unit (GPU). Some GPUs are capable of very high performance using a relatively large number of small, parallel execution threads on dedicated programmable hardware processing units. The specialized design of such GPUs usually allows these GPUs to perform certain tasks, such as rendering three-dimensional (3D) scenes, much faster than a CPU. However, the specialized design of these GPUs also limits the types of tasks that the GPU can perform. The CPU is typically a more general-purpose processing unit and therefore can perform most tasks. Consequently, the CPU usually executes the overall structure of a software application and configures the GPU to perform specific tasks in a graphics pipeline.

In a hybrid computing system, there may be a plurality of GPUs working together to perform certain tasks. An integrated GPU (iGPU) generally provides lower-power graphics processing, and one or more discrete GPUs (dGPU) provides higher-performance graphics processing. Most commonly, a dGPU is located on an add-in card that is connected to the computing system via a Peripheral Component Interconnect Express (PCI Express or PCIe) expansion bus and slot.

One goal of a hybrid computing system is to save power by turning OFF the dGPU and switching processing to only the lower-power iGPU when the additional processing capabilities of the dGPU are not needed. A hybrid microcontroller (hEC) is located on the add-in card with the dGPU and controls power to the dGPU. Most commonly, the hEC is addressable via a system management bus (SMBus) interface and, therefore, requires a unique SMbus address to be accessed by the System Basic Input/Output System (SBIOS) and graphics driver. Any number of similar add-in cards, each with one or more hECs, as well as other SMbus devices (e.g., a dual in-line memory module or a network adapter) may be located in the system. Each of these add-in cards and other SMbus devices requires a unique SMbus address too. Additionally, further add-in cards and other devices can be added, removed, or replaced in the system. Since the system configuration can change, using a fixed address scheme is not a viable solution for assigning SMbus addresses to the add-in cards and other SMbus devices.

As a general matter, assigning SMbus addresses to add-in cards has proven to be challenging. The primary problem is that the SBIOS is generally not pre-programmed to know the SMbus addresses of each of the slots on the PCIe bus or which slot corresponds to the SMbus address of the particular hEC that controls the GPU on a particular add-in card. In addition, the graphics driver cannot determine the SMbus address because the graphics driver cannot communicate with a device that is OFF, nor can the graphics driver access the registers of an hEC device.

In certain prior art approaches, an Address Resolution Protocol (ARP) has been used to dynamically resolve SMbus addresses. ARP is a well-known protocol that requires all devices to start in an OFF state at a default listening address. Then, a broadcast is transmitted to all devices on a bus, and the first device that responds "wins" that address. This round-robin protocol is then repeated until each device receives a unique address. There are several limitations of ARP that cause the protocol to function more inefficiently than intended. First, not all hECs are compatible with ARP. For example, sometimes an hEC cannot respond to two addresses simultaneously, which causes the hEC to not respond at the default listening address and carry out the ARP protocol. This incompatibility precludes an SMbus address from being assigned to the hEC. Second, almost no original equipment manufacturer (OEM) implements ARP in their motherboards. ARP is simply too complex for many OEMs to implement, and the protocol is almost universally disfavored.

As the foregoing shows, what is needed in the art is a simpler technique for assigning SMbus addresses to hECs included on graphics add-in cards that is compatible with different types of hECs and different OEM motherboard configurations.

SUMMARY OF THE INVENTION

An embodiment of the invention provides for a computing system configured to determine an address for a device coupled to a system bus. The computing system includes an add-in card having an hEC and a GPU, such that the hEC controls power to the GPU. Additionally, an SBIOS is configured to store a list of available addresses to be allocated to one or more devices coupled to the system bus. A graphics driver is coupled to the SBIOS and to the GPU, and is configured to request the list of available addresses from the SBIOS, select a first address from the list of available addresses, and program the hEC with the first address through the GPU.

One advantage of the disclosed system is that SMbus addresses may be assigned to different types of hECs and other SMbus devices in systems with different motherboard configurations. More specifically, an hEC that is not compatible with ARP can be assigned an SMbus address allowing the hEC to be directly controlled by the SBIOS. Additionally, embodiments of the invention allow for initialization and power control of an SMbus device that is completely OFF and would normally be unavailable to the SBIOS.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. The appended drawings illustrate only typical embodiments of this invention and are therefore not to be considered limiting of its scope, for the invention may admit to other equally effective embodiments.

DETAILED DESCRIPTION

Figure 1:
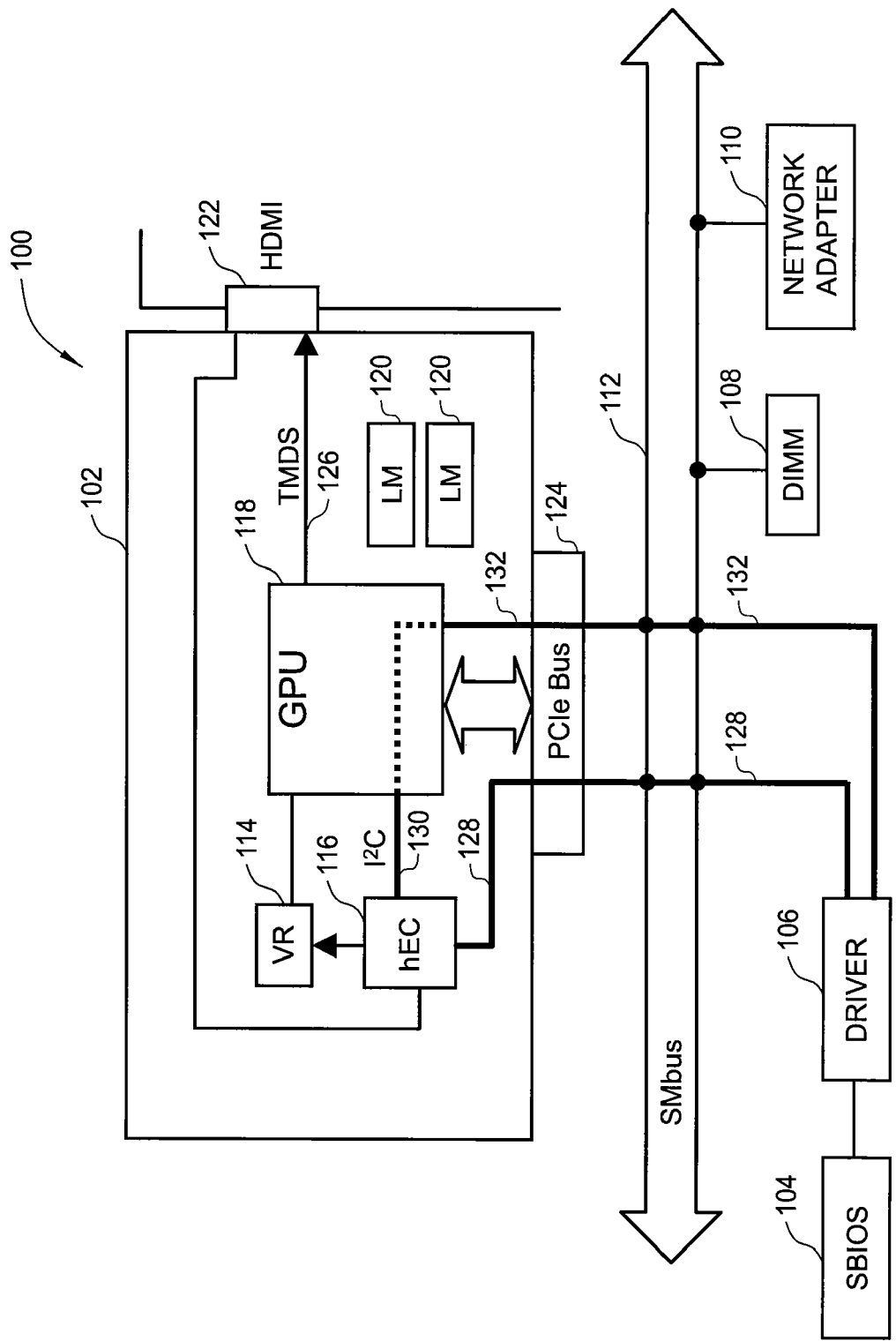
FIG. 1 is a conceptual diagram of a computing system in which one or more aspects of the invention may be implemented.

FIG. 1 is a conceptual diagram of a computing system 100 in which one or more aspects of the invention may be implemented. As shown, the computing system 100 includes an add-in card 102, SBIOS 104, graphics driver 106, dual in-line memory module 108, network adapter 110, and SMbus 112. Those skilled in the art will recognize, however, that the components shown in FIG. 1 are simplified to highlight certain aspects of the present invention and that a typical computing system 100 may include a broad variety of additional components. In one embodiment, add-in card 102 includes voltage regulator 114, hEC 116, GPU 118, and local memory 120. The add-in card 102 may further include a Transition Minimized Differential Signaling (TMDS) data connection 126 for transmitting data streams to a High-Definition Multimedia Interface (HDMI) 122, and a PCIe expansion card interface 124 to connect the add-in card 102 to a motherboard (not shown).

The GPU 118 is coupled to the graphics driver 106 via connection 132. The GPU 118 may receive instructions transmitted from the graphics driver 106, process the instructions in order to render graphics images, and store the graphics images in the GPU local memory 120 or system memory (not shown). The GPU 118 typically has higher performance and a richer graphics feature set than the iGPU (not shown) residing elsewhere in the computing system 100, as described above.

The voltage regulator 114 controls power to the GPU 118. The GPU 118 is typically OFF when no power is supplied to the GPU 118 from the voltage regulator 114. Importantly, the hEC 116 is powered by a different power source than the GPU 118. The hEC 116 is powered-on whenever the computing system 100 is operational, even when the GPU 118 is OFF.

The hEC 116 controls delivery of power to the GPU 118 and the local memory 120 from the voltage regulator 114. The hEC 116 is addressable via the SMBus 112 and connection 128. Like other devices using SMbus 112, the hEC 116 requires a unique SMbus address in order to be accessed directly by SBIOS 104 and the graphics driver 106. Any number of add-in cards (each with one or more additional hECs) and other SMbus devices (for other motherboard or add-in card functions) may be located in the computing system 100. Additionally, the hEC 116 is connected to the GPU 118 via an Inter-Integrated Circuit ($I^2C$) connection 130. As is well-known, $I^2C$ is a bus that couples peripherals to a motherboard or embedded system.

SBIOS 104 includes the firmware code that is executed by a computing system 100 when the computing system is first powered on or when the system is returning from a reset. In one embodiment, the SBIOS 104 is responsible for preliminary device initialization, which includes allocating the unique SMbus addresses for each piece of hardware coupled to the SMbus 112, such as the hEC 116 residing on the add-in card 102, the dual in-line memory module 108, the network adapter 110, other SMbus devices, and the like.

During initialization of the computing system 100, the SBIOS 104 allocates a unique SMbus address for each hEC 116 located in the computing system 100. Again, the SBIOS 104 is generally not pre-programmed with the SMbus address of each slot on the PCIe bus or with the knowledge of which slot corresponds to the SMbus address of the particular hEC that controls the GPU on a particular add-in card. As described in greater detail herein, there are various techniques that the SBIOS 104 can implement to determine a list of SMbus addresses available for SMbus devices, like the hEC 116, that have yet to be assigned SMbus addresses. First, the SBIOS 104 can generate a listing of available SMbus addresses based on the list of pre-allocated SMbus addresses already reserved for various SMbus devices. Second, the SBIOS 104 may be configured to dynamically determine the list of available SMbus addresses by scanning an unused SMbus address space.

Figure 2:
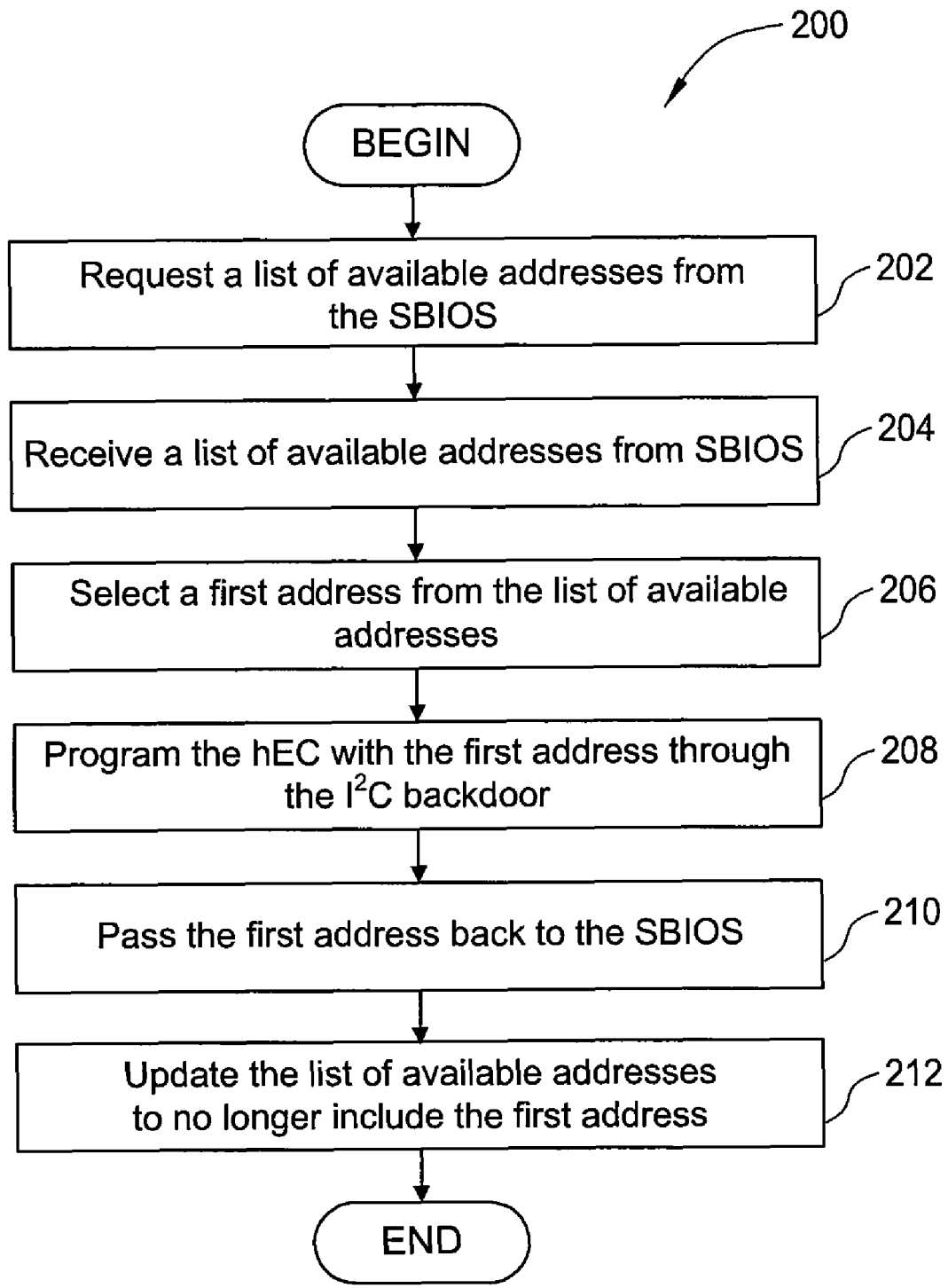
FIG. 2 is a flow diagram of method steps for dynamically assigning bus addresses, according to one embodiment of the invention.

FIG. 2 is a flow diagram of method steps for dynamically assigning bus addresses, according to one embodiment of the invention. Persons skilled in the art will understand that, even though the method is described in conjunction with the computing system 100 of FIG. 1, any system configured to perform the steps, in any order, is within the scope of the present invention.

As shown, at step 202, the graphics driver 106 requests a list of available SMbus addresses from the SBIOS 104. As described above, the first way the SBIOS 104 can generate a listing of available SMbus addresses is based on a list of pre-allocated SMbus addresses already reserved for various SMbus devices. For example, when each of the SMbus devices of a computing system 100 is designed, the designers provide a list of pre-allocated SMbus addresses reserved for those devices to the motherboard designers that configure the SBIOS 104. The motherboard designers can configure the SBIOS 104 with this address information. Since the SBIOS 103 has knowledge of the overall address space available for SMbus devices as well as the specific addresses already allocated to specific SMbus devices, the SBIOS 104 can determine which addresses in the overall address space are still available for SMbus devices such as the hEC 116. A second technique that the SBIOS 104 may implement is to determine the list dynamically. The SBIOS designers may have no prior knowledge of the layout of the computing system 100, e.g., no knowledge of what combination of memory chips, power management devices, or other devices reside in the computing system 100. The SBIOS designers can inform the OEM system vendors of an SMbus address range to leave unused for other devices in the system that require SMbus addresses. The OEM system vendors then leave that SMbus address range unused so that the SBIOS 104 can allocate SMbus addresses in that range to other devices in the system. Other techniques for configuring the SBIOS 104 to determine the list of unused SMbus addresses known to those persons having ordinary skill in the art are intended to fall within the scope of the present invention.

At step 204, the graphics driver 106 receives the list of available SMbus addresses from the SBIOS 104. At step 206, the graphics driver 106 selects a first address from the list of available SMbus addresses to assign to the hEC 116.

At step 208, the graphics driver 106 programs the hEC 116 with the first address through an $I^2C$ backdoor 130. More specifically, during initialization, the graphics driver 106 assumes that the GPU 118 is powered ON, allowing the graphics driver 106 to access the GPU 118 via connection 132. The first address is then programmed from the GPU 118 to the hEC 116 via the $I^2C$ connection 130 ("$I^2C$ backdoor"). The graphics driver 106 is capable of programming the hEC 116 with the first address "through" the GPU 118 because the graphics driver 106 is able to determine how many hECs reside in the computing system 100, the number of PCIe slots in the computing system 100, and with which PCIe slot and hEC the graphics driver 106 is currently communicating. In this fashion, the graphics driver 106 creates an association with an SMbus address for the hEC 116. Once the hEC 116 has been assigned a unique SMbus address, both the SBIOS 104 and the graphics driver 106 may communicate directly with the hEC 116. In one embodiment, the first address is assigned to a local variable (HADR), and the SBIOS 104 may communicate with the hEC 116 using the HADR as a reference for the hEC 116.

At step 210, the graphics driver 106 passes the first address back to the SBIOS 104 for subsequent use by the SBIOS 104 or the graphics driver 106. At step 212, the list of available SMbus addresses (from step 202) is updated to no longer include the first address. The steps 202-212 may be repeated for each hEC 116 within the computing system 100 that is to be assigned an SMbus address. In one embodiment, the graphics driver 106 is configured to maintain the list of available addresses, remove the first address from the list of available addresses, and generate an updated list of available addresses. In another embodiment, the SBIOS 104 is configured to maintain the list of available addresses, remove the first address from the list of available addresses, and generate an updated list of available addresses.

Figure 3:
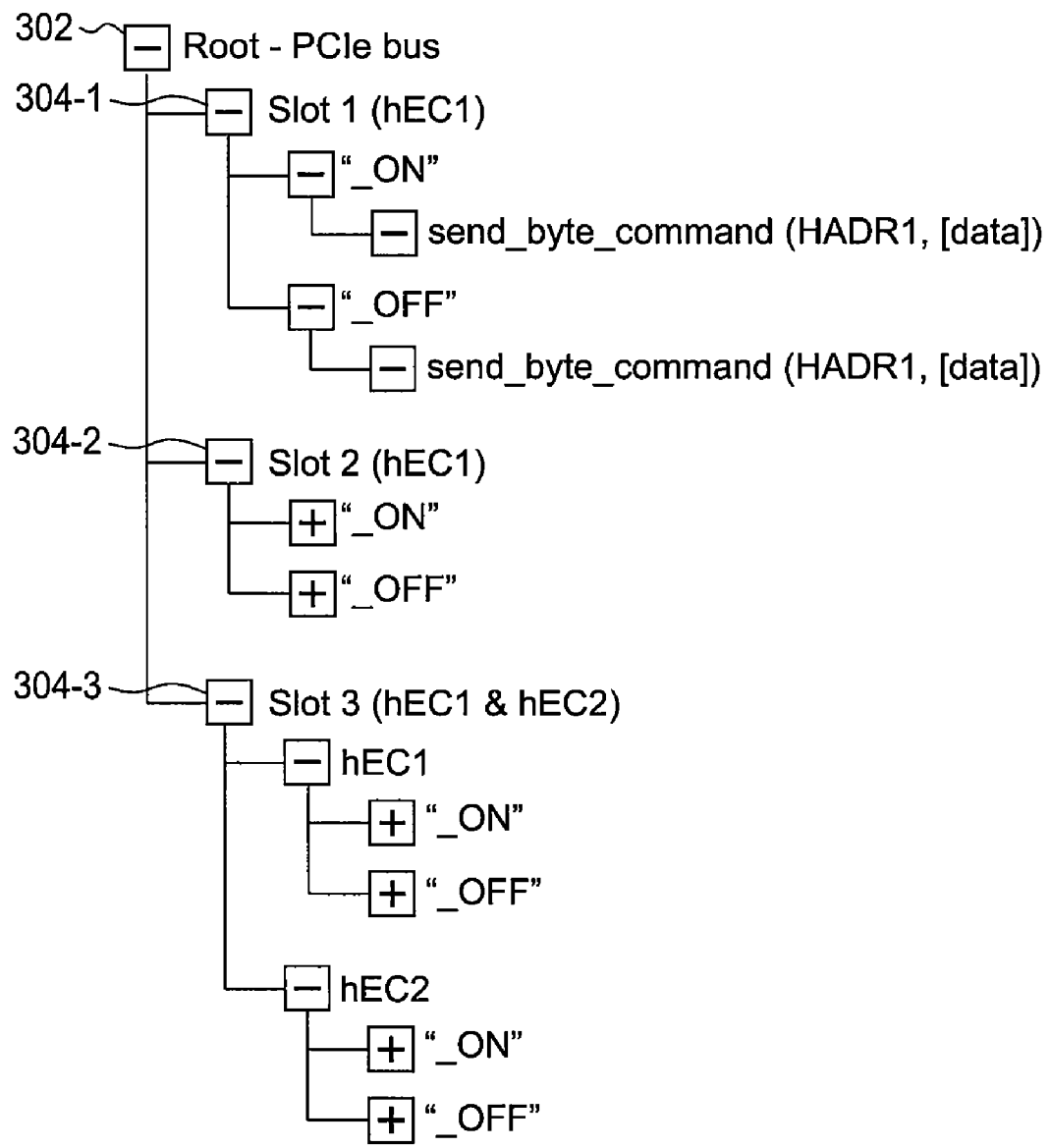
FIG. 3 is a conceptual diagram of a PCIe expansion bus having multiple slots, according to one embodiment of the invention.

FIG. 3 is a conceptual diagram of a PCIe expansion bus having multiple slots, according to one embodiment of the invention. As shown, the PCIe expansion bus has a tree structure format where the PCIe bus 302 is a root of the tree, and each of the multiple slots 304-1, 304-2, and 304-3 are branches of the tree. The PCIe bus 302 has three slots 304-1, 304-2, and 304-3. Slots 304-1 and 304-2 each have only one hEC residing on the add-in card in that slot. In contrast, slot 304-3 has an add-in card with two devices, hEC1 and hEC2. The SBIOS 104 may execute an "_ON()" function to turn ON any hEC within the computing system 100 and may execute an "_OFF()" function to turn OFF any hEC within the computing system 100. Each device on the PCIe bus corresponds to a separate and distinct _ON() and _OFF() function. Further, each device in slot 304-3 has a unique SMbus address, allowing the SBIOS 104 to control each hEC device individually. For example, hEC1 may be turned ON and hEC2 may be turned OFF during the same period of system operation.

After initialization, as described above in FIG. 2, all of the hECs and other SMbus devices in the computing system 100 are allocated a unique SMbus address. Each SMbus address may be stored in a local variable in a location relative to data stored for the hEC and the GPU so that the location of the first address can be reused in subsequent operation requests involving the hEC and the GPU at runtime. Thus, once the SMbus addresses are allocated, the SBIOS 104 may directly control each hEC, as well as the one or more GPUs corresponding to each hEC, by accessing the local variables. For example, the SBIOS 104 or the operating system may execute a pre-defined function, "send_byte_command()" to control a particular hEC using the local variable corresponding to that hEC as an input to the pre-defined function. In this fashion, the hECs may be instructed to power-on and to power-off a corresponding GPU via the "_ONO" and "_OFF()" functions, as described above. When a local variable is passed to the pre-defined function, what is actually passed is the location of the storage space, HADR1 of FIG. 3. Since the local variables are the inputs to the pre-defined function, the specific SMbus addresses allocated for each of the hECs in the computing system 100 need not be directly programmed or "hard-coded" into the firmware code of the SBIOS 104 or tied to a specific slot location or GPU.

One advantage of the systems and methods disclosed herein is that SMbus addresses may be assigned to different types of hECs and other SMbus devices in systems with different motherboard configurations. More specifically, an hEC that is not compatible with ARP can be assigned an SMbus address allowing the hEC to be directly controlled by the SBIOS. Additionally, embodiments of the invention allow for initialization and power control of an SMbus device that is completely OFF and would normally be unavailable to the SBIOS.

While the foregoing is directed to embodiments of the present invention, other and further embodiments of the invention may be devised without departing from the basic scope thereof. For example, the add-in card may include multiple GPUs connected to a single hEC. Also, the add-in card may include a first GPU connected to a first hEC and a second GPU connected to a second hEC. Embodiments of the present invention may be implemented to assign unique SMbus addresses to each of the hECs in the computing system, irrespective of the number of GPUs or hECs per add-in card or the number of add-in cards. Also, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A computing system configured to determine an address for a device coupled to a system bus, the computing system comprising:
    an add-in card having a hybrid microcontroller (hEC) coupled to a graphics processing unit (GPU) via a first connection and to the system bus, wherein the hEC controls power to the GPU;
    a System Basic Input/Output System (SBIOS) configured to store a list of available system bus addresses to be allocated to one or more devices coupled to the system bus; and
    a graphics driver coupled to the SBIOS via a second connection and coupled to the GPU via a third connection and configured to:
        request the list of available system bus addresses from the SBIOS via the second connection,
        select a first system bus address from the list of available system bus addresses, and
        assign the first system bus address to the hEC through the GPU via the third connection and the first connection.

2. The computing system of claim 1, wherein the graphics driver is further configured to pass the first system bus address to the SBIOS via the second connection for subsequent use by the SBIOS or the graphics driver.

3. The computing system of claim 2, wherein the SBIOS is configured to remove the first system bus address from the list of available system bus addresses and generate an updated list of available system bus addresses in response to receiving the first system bus address.

4. The computing system of claim 2, wherein the first system bus address is stored in a location relative to data stored for the hEC and the GPU so that the location of the first system bus address can be reused in subsequent operation requests involving the hEC and the GPU.

5. The computing system of claim 1, wherein the graphics driver is configured to remove the first system bus address from the list of available system bus addresses and generate an updated list of available system bus addresses.

6. The computing system of claim 5, wherein each device coupled to the system bus is allocated a unique system bus address.

7. The computing system of claim 1, wherein the add-in card is connected to a motherboard via a Peripheral Component Interconnect Express (PCIe) expansion bus and slot.

8. The computing system of claim 1, wherein the system bus comprises a System Management bus (SMbus).

9. The computing system of claim 1, wherein the first connection comprises an Inter-Integrated Circuit (I²C) connection.

10. The computing system of claim 1, wherein the add-in card includes a second hEC coupled to a second GPU via a fourth connection, wherein the second GPU is coupled to the graphics driver via a fifth connection, and wherein the graphics driver is further configured to:

select a second address from the list of available system bus addresses, and assign the second system bus address to the second hEC through the second GPU via the fifth connection and the fourth connection.

11. The computing system of claim 10, wherein the graphics driver is further configured to pass the second system bus address to the SBIOS via the second connection.

12. The computing system of claim 1, wherein the add-in card includes a second GPU connected to the hEC via a fourth connection, wherein the hEC controls power to the second GPU.

13. A method for determining an address for a device coupled to a system bus, the method comprising:

requesting from a System Basic Input/Output System (SBIOS) a list of system bus addresses available for allocation to one or more devices coupled to the system bus;

selecting a first system bus address from the list of system bus addresses available for allocation to one or more devices coupled to the system bus; and assigning the first system bus address to a hybrid microcontroller (hEC) via a graphics processing unit (GPU), wherein the hEC and the GPU are coupled to an add-in card that is coupled to the system bus.

14. The method of claim 13, further comprising the step of passing the first system bus address to the SBIOS.

15. The method of claim 13, further comprising the steps of:

selecting a second system bus address from the list of system bus addresses available for allocation to one or more devices coupled to the system bus; and assigning the second system bus address to the second hEC via a second GPU, wherein the second hEC and the second GPU are coupled to the add-in card.

16. The method of claim 13, wherein the list of system bus addresses available for allocation to one or more devices coupled to the system bus is generated based on a list of pre-allocated system bus addresses already reserved for various other devices coupled to the system bus.

17. The method of claim 13, wherein the list of system bus addresses available for allocation to one or more devices coupled to the system bus is generated dynamically by scanning an unused system bus address space.

18. A computer-readable storage medium storing instructions that, when executed by a processing unit, cause the processing unit to determine an address for a device coupled to a system bus, by performing the steps of:

requesting from a System Basic Input/Output System (SBIOS) a list of system bus addresses available for allocation to one or more devices coupled to the system bus;

selecting a first system bus address from the list of system bus addresses available for allocation to one or more devices coupled to the system bus; and assigning the first system bus address to a hybrid microcontroller (hEC) via a graphics processing unit (GPU), wherein the hEC and the GPU are coupled to an add-in card that is coupled to the system bus.

19. The computer-readable storage medium of claim 18, further comprising the step of passing the first system bus address to the SBIOS.

20. The computer-readable storage medium of claim 18, further comprising the steps of:

selecting a second system bus address from the list of system bus addresses available for allocation to one or more devices coupled to the system bus; and assigning the second system bus address to a second hEC via a second GPU, wherein the second hEC and the second GPU are coupled to the add-in card.

21. The computer-readable storage medium of claim 18, wherein the list of system bus addresses available for allocation to one or more devices coupled to the system bus is generated based on a list of pre-allocated system bus addresses already reserved for various other devices coupled to the system bus.

22. The computer-readable storage medium of claim 18, wherein the list of system bus addresses available for allocation to one or more devices coupled to the system bus is generated dynamically by scanning an unused bus address space.

* * * * *